United States Patent
Kodama et al.

(10) Patent No.: US 11,883,802 B2
(45) Date of Patent: Jan. 30, 2024

(54) SILICON CARBIDE POROUS BODY AND METHOD FOR PRODUCING THE SAME

(71) Applicant: NGK INSULATORS, LTD., Nagoya (JP)

(72) Inventors: Suguru Kodama, Nagoya (JP); Makoto Hamazaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 830 days.

(21) Appl. No.: 16/357,834

(22) Filed: Mar. 19, 2019

(65) Prior Publication Data

US 2019/0299196 A1  Oct. 3, 2019

(30) Foreign Application Priority Data

Mar. 30, 2018 (JP) .................. 2018-070028

(51) Int. Cl.
  *B01J 27/224* (2006.01)
  *B01J 29/072* (2006.01)
  (Continued)

(52) U.S. Cl.
  CPC ........ *B01J 27/224* (2013.01); *B01D 46/2429* (2013.01); *B01D 46/2474* (2013.01); *B01D 46/2482* (2021.08); *B01D 46/24491* (2021.08); *B01D 53/9413* (2013.01); *B01J 21/16* (2013.01); *B01J 29/072* (2013.01); *B01J 35/04* (2013.01); *B01J 37/0018* (2013.01); *B01J 37/0063* (2013.01); *B01J 37/08* (2013.01); *C04B 35/06* (2013.01); *C04B 35/565* (2013.01);
  (Continued)

(58) Field of Classification Search
  CPC .................................................. C04B 38/006
  See application file for complete search history.

(56) References Cited

U.S. PATENT DOCUMENTS

| | | |
|---|---|---|
| 2003/0021949 A1 | 1/2003 | Tomita et al. |
| 2003/0041574 A1 | 3/2003 | Noguchi et al. |
| | (Continued) | |

FOREIGN PATENT DOCUMENTS

| | | | | |
|---|---|---|---|---|
| CN | 1277173 A | * | 12/2000 | ......... C04B 38/0635 |
| CN | 107266079 A | | 10/2017 | |
| | (Continued) | | | |

OTHER PUBLICATIONS

English language translation of CN 1277173 A, generated on Aug. 6, 2021 with Espacenet website (https://www.epo.org/searching-for-patents/technical/espacenet.html).*

(Continued)

*Primary Examiner* — Mark Ruthkosky
*Assistant Examiner* — Julia L Rummel
(74) *Attorney, Agent, or Firm* — BURR PATENT LAW, PLLC

(57) ABSTRACT

A silicon carbide porous body includes: (A) silicon carbide particles as an aggregate; and (B) at least one selected from the group consisting of metallic silicon, alumina, silica, mullite and cordierite. The silicon carbide porous body has amorphous and/or crystalline $SiO_2$ or SiO on a surface(s) of the component (A) and/or the component (B). The silicon carbide porous body contains 6% by mass or less of α-cristobalite in the amorphous and/or crystalline $SiO_2$ or SiO.

13 Claims, 4 Drawing Sheets

(51) Int. Cl.
- *B01J 37/00* (2006.01)
- *B01J 37/08* (2006.01)
- *B01J 21/16* (2006.01)
- *C04B 35/565* (2006.01)
- *C04B 35/63* (2006.01)
- *C04B 35/636* (2006.01)
- *C04B 35/06* (2006.01)
- *C04B 38/00* (2006.01)
- *B01D 53/94* (2006.01)
- *B01D 46/24* (2006.01)
- *B01J 35/04* (2006.01)

(52) U.S. Cl.
CPC ...... *C04B 35/6316* (2013.01); *C04B 35/6365* (2013.01); *C04B 38/0006* (2013.01); *B01D 2255/20761* (2013.01); *B01D 2255/50* (2013.01); *B01D 2279/30* (2013.01); *C04B 2235/3201* (2013.01); *C04B 2235/3206* (2013.01); *C04B 2235/3217* (2013.01); *C04B 2235/349* (2013.01); *C04B 2235/3418* (2013.01); *C04B 2235/3826* (2013.01); *C04B 2235/428* (2013.01)

(56) References Cited

U.S. PATENT DOCUMENTS

| | | |
|---|---|---|
| 2003/0165638 A1 | 9/2003 | Louks et al. |
| 2004/0231307 A1 | 11/2004 | Wood et al. |
| 2006/0003889 A1* | 1/2006 | Furukawa ............ B01J 23/02 502/178 |
| 2006/0177629 A1* | 8/2006 | Kunieda ............ B01J 35/04 428/116 |
| 2006/0216466 A1* | 9/2006 | Yoshida ............ B01D 39/2093 428/116 |
| 2007/0241484 A1 | 10/2007 | Morimoto |
| 2014/0296054 A1* | 10/2014 | Kikuchi ............ C04B 38/0019 502/1 |
| 2014/0357476 A1 | 12/2014 | Bischof et al. |
| 2017/0282108 A1 | 10/2017 | Mizuno et al. |
| 2018/0319114 A1 | 11/2018 | Shibayama et al. |

FOREIGN PATENT DOCUMENTS

| | | | |
|---|---|---|---|
| EP | 344284 B1 * | 2/1995 | ......... B01D 39/2075 |
| JP | H06-182228 A1 | 7/1994 | |
| JP | 07187785 A * | 7/1995 | |
| JP | 2002-219319 A1 | 8/2002 | |
| JP | 2005-516877 A1 | 6/2005 | |
| JP | 4426083 B2 | 3/2010 | |
| JP | 4745964 B2 | 8/2011 | |
| JP | 2016-523800 A1 | 8/2016 | |
| JP | 2017-178721 A1 | 10/2017 | |
| WO | 2017/146087 A1 | 8/2017 | |

OTHER PUBLICATIONS

Ding, S.; Zhu, S.; Zeng, Y.; Jiang, D.; "Fabriction of Mullite-Bonded Porous Silicon Carbide Ceramics by In Situ Reaction Bonding". Journal of the European Ceramic Society, 2007, 27, 2095-2102.*

English language translation of JP 07-187785 A, generated on Nov. 30, 2022 with J-Pat Plat website (https://www.j-platpat.inpit.go.jp/).*

Spearing, D.; Farnan, I.; Stebbins, J.; "Dynamics of the a-B Phase Transitions in Quartz and Cristobalite as Observed by In-Situ High Temperature 29Si and 17O NMR", 1992, 19, p. 307-321.*

Japanese Office Action (Application No. 2018-070028) dated Oct. 20, 2020 (with English translation).

Chinese Office Action, Chinese Application No. 201910226312.7, dated Mar. 2, 2022 (7 pages).

German Office Action (with English translation) dated May 30, 2023 (Application No. 10 2019 002 145.2).

* cited by examiner

[FIG. 1]
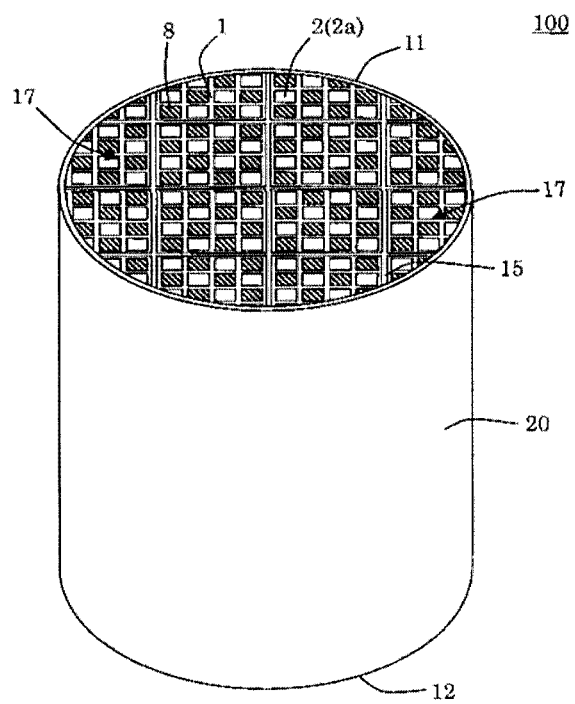

[FIG. 2]
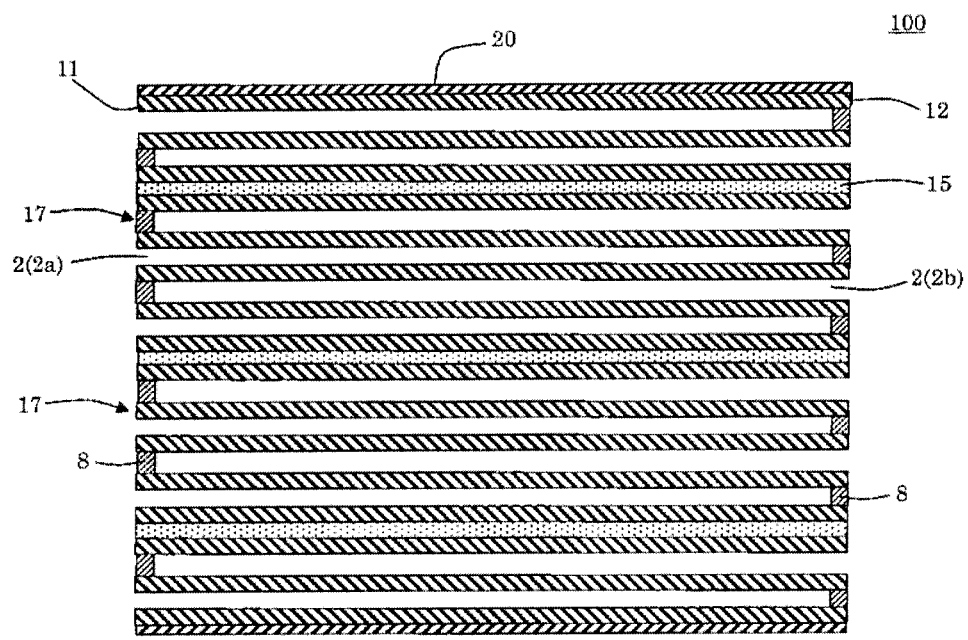

[FIG. 3]
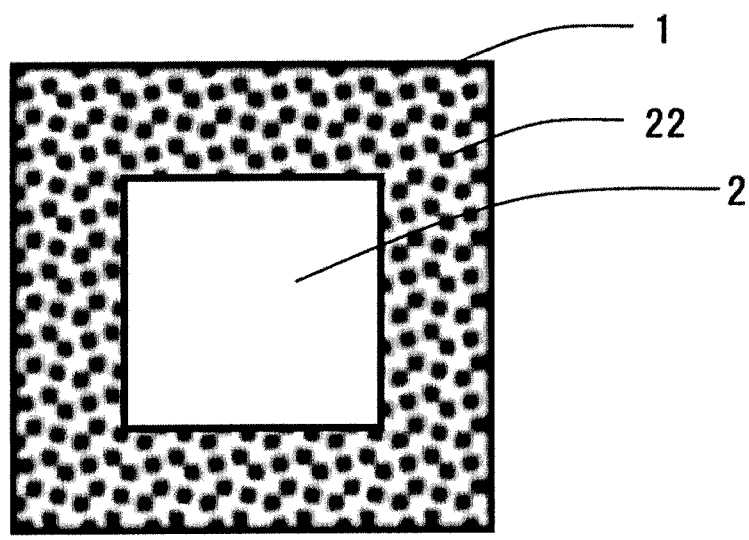

[FIG. 4]
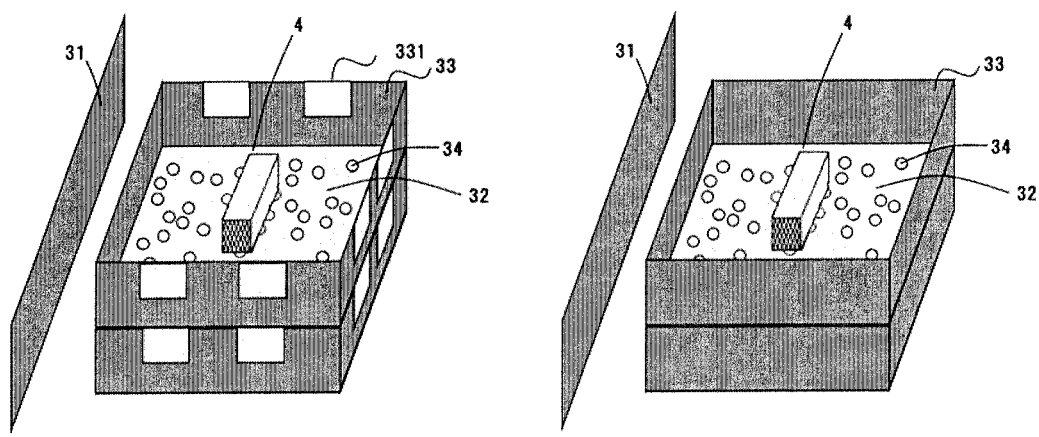

SILICON CARBIDE POROUS BODY AND METHOD FOR PRODUCING THE SAME

TECHNICAL FIELD

The present invention relates to a silicon carbide porous body and a method for producing the same. In particular, the present invention relates to a silicon carbide porous body used in a filter, a catalyst support and the like for purifying an exhaust gas of a motor vehicle and to a method for producing the same.

BACKGROUND ART

As a filter for trapping and removing particulate matters contained in a dust-containing fluid such as a diesel engine exhaust gas or as a catalyst support for supporting a catalyst component for purifying harmful substances in the exhaust gas, a porous honeycomb structures are widely used. It is also known to use refractory particles such as silicon carbide (SiC) particles as a material for forming such a honeycomb structure.

As a specific related art, for example, Patent Document 1 discloses a porous silicon carbide catalyst support having a honeycomb structure, obtained by forming a silicon carbide powder having a predetermined specific surface area and an impurity content as a starting material into a desired shape, drying the resulting formed body and then firing it in a temperature range of from 1600 to 2200° C.

When the sintered body produced by this approach is used as a material of a diesel particulate filter (DPF) for removing particulates contained in an exhaust gas discharged from a diesel engine, there is a problem that local heat generation occurs to result in destruction of the filter due to lower thermal conductivity when attempting to burn the particulates accumulated and deposited in the filter in order to regenerate the filter.

To address this problem, Patent Document 2 discloses that a silicon carbide porous body which contains silicon carbide particles as an aggregate and metallic silicon and which has phases each containing oxygen (an oxide film) on surfaces of the silicon carbide particles and the metallic silicon, and which also has an oxygen content of from 0.5 to 15% by weight can produce higher thermal conductivity and provide improved oxidation resistance, acid resistance, resistance to particulate reactivity and thermal shock resistance and the like.

On the other hand, recently, there is a need for a porous honeycomb structure having a lower pressure loss and a higher porosity, among the above porous honeycomb structures, in particular to improve a throughput of a dust collection filter. As a method for such a higher porosity honeycomb structure, for example, a method for producing a porous honeycomb structure is disclosed in which a main component material, water, an organic binder (which requires the use of an organic binder such as methyl cellulose for improving plasticity, because extrusion molding of only the main component material into a honeycomb structure results in insufficient plasticity and formability, which cannot allow smooth molding) and a pore former (an organic material such as graphite), and the like, are kneaded so as to improve plasticity to prepare a green body, and the green body is extruded and dried to prepare a honeycomb formed body, and the honeycomb formed body is fired to obtain a porous honeycomb structure (see, for example, Patent Document 3). According to such a producing method, when the honeycomb formed body is fired, the organic binder and the pore former are burn out to form pores, so that a porous honeycomb structure having a higher porosity can be obtained.

However, there is a problem that if an amount of the organic binder added is higher, the organic binder is burned out during calcination (binder removal), and spaces occupied by the organic binder form defects during the molding, so that the strength of the resulting calcined body, and hence the porous honeycomb structure, is decreased. Further, in a large-sized structure, there is a problem that when the organic binder is burned during calcination (binder removal), an inner side of the formed body has a higher temperature than that of an outer side due to combustion heat, and the thermal stress due to a difference between the internal and external temperatures of the formed body results in generation of defects such as cracks in the calcined body, so that the mechanical strength of the structure is decreased as well as the yield is significantly reduced.

To address this problem, Patent Document 4 discloses a method for producing a porous honeycomb structure by kneading a forming raw material containing a main component material comprised of a non-oxide ceramics or the non-oxide ceramics and a metal, as well as an organic binder; and a pore former to prepare a green body, and forming and drying the prepared green body to prepare a formed body having a honeycomb shape (a honeycomb formed body), calcining the prepared honeycomb formed body to obtain a calcined body, and then firing the calcined body to obtain a porous honeycomb structure, wherein the main component material further contains from 0.01 to 1 part by mass of an inorganic material having a layered structure (smectite or the like) based on 100 parts by mass of the main component material, in addition to the main component material and the organic binder. According to this method, a method for producing a porous honeycomb structure having higher porosity and higher quality and a porous honeycomb structure obtained by the producing method are provided that can obtain a calcined body having higher strength and decreased defects such as cracks after calcination (binder removal), and can finally obtain a porous honeycomb structure having higher quality and higher porosity.

Further, Patent Document 5 discloses a formed ceramic substrate containing an oxide ceramic material, wherein the formed ceramic substrate has an elemental sodium content of less than about 1200 ppm and a porosity of at least about 55%. It also discloses that the use of the formed ceramic substrate can reduce chemical interaction with a catalyst for selective catalytic reduction (SCR) to provide higher NOx purification performance.

CITATION LIST

Patent Literatures

Patent Document 1: Japanese Patent Application Publication No. H06-182228 A
Patent Document 2: Japanese Patent No. 4426083 B
Patent Document 3: Japanese Patent Application Publication No. 2002-219319 A
Patent Document 4: Japanese Patent No. 4745964 B
Patent Document 5: Japanese Patent Application Publication No. 2016-523800 A

SUMMARY OF INVENTION

Technical Problem

It is desirable that the silicon carbide porous body has higher porosity in order to support a large amount of selective reduction catalysts, as a material for supporting the selective reduction catalyst which is recently increasing the demand. However, although a large amount of organic substances of the pore former is required to increase the porosity, and an increased amount of a layered inorganic material serving as an inorganic binder is required to maintain the strength after degreasing in the producing process, an increase amount of an alkali ion type smectite including a Na type montmorillonite which has a good function as an inorganic binder and is widely used (see Patent Document 4) results in an increased content of an alkali metal which facilitates the formation of an α-cristobalite phase in the oxide film, so that the thermal expansion due to phase transition from α to β, thereby decreasing the thermal shock resistance.

Further, in the case of the invention disclosed in Patent Document 2, a specific surface area of the silicon carbide porous body is increased, an amount of the oxide film is increased accordingly, and the thermal expansion is increased due to the phase transition from α to β of the α-cristobalite contained in the oxide film, so that the thermal shock resistance is further decreased.

The invention disclosed in Patent Document 5, that is, the invention to control a sodium element content contained in the formed ceramic substrate focuses on reduction of chemical interaction between sodium contained in the formed ceramic substrate and the selective reduction catalyst, and do not recognize the above problem of thermal shock resistance. Further, the cordierite or aluminum titanate for the catalyst support used as the formed ceramic substrate in Patent Document 5 has a limit for reduction of the alkali metal due to the production method of industrial alumina as a main raw material, and is very difficult to produce a material having a sodium content of 500 ppm or less in the industry. Therefore, the problem of thermal shock resistance cannot be fundamentally solved.

The present invention has been made in view of the above problems. An object of the present invention is to provide a silicon carbide porous body having higher thermal shock resistance and a method for producing the same.

Solution to Problem

As a result of intensive studies, the present inventors have found that controlling of impurities in various raw materials of the silicon carbide porous body or controlling of a firing atmosphere (a shape and a material of a sintering sagger, and an oxidation treatment temperature) and the like suppresses sodium contamination, the formation of α-cristobalite in the oxide film and an increase in a thermal expansion coefficient, thereby providing a silicon carbide porous body having higher heat resistance and higher thermal shock resistance, and have completed the present invention. Thus, the present invention is specified as follows:

(1)
A silicon carbide porous body comprising: (A) silicon carbide particles as an aggregate; and (B) at least one selected from the group consisting of metallic silicon, alumina, silica, mullite and cordierite, the silicon carbide porous body having amorphous and/or crystalline $SiO_2$ or SiO on a surface(s) of the component (A) and/or the component (B), wherein the silicon carbide porous body comprises 6% by mass or less of α-cristobalite in the amorphous and/or crystalline $SiO_2$ or SiO.

(2)
The silicon carbide porous material according to (1), wherein the amorphous and/or crystalline $SiO_2$ or SiO has a thickness of 0.5 μm or more.

(3)
The silicon carbide porous material according to (1) or (2), wherein the silicon carbide porous material comprises from 1 to 5 parts by mass of an inorganic binder based on 100 parts by mass of the total of (A) and (B).

(4)
The silicon carbide porous material according to (3), wherein the inorganic binder is smectite.

(5)
The silicon carbide porous material according to (4), wherein the smectite is montmorillonite.

(6)
The silicon carbide porous material according to any one of (1) to (5), wherein the silicon carbide porous material has a sodium content of from 0 to 0.12% by mass in $Na_2O$ equivalent.

(7)
The silicon carbide porous material according to any one of (1) to (6), wherein the silicon carbide porous material has a sodium content of from 0 to 0.05% by mass in $Na_2O$ equivalent.

(8)
The silicon carbide porous material according to any one of (1) to (7), wherein the silicon carbide porous material has a porosity of 55% or more.

(9)
A honeycomb structure comprising the silicon carbide porous body according to any one of (1) to (8).

(10)
A method for producing the silicon carbide porous material according to any one of (1) to (9), comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it to produce amorphous and/or crystalline $SiO_2$ or SiO on a surface(s) of the component (A) and/or the component (B), wherein the method comprises controlling a content of sodium in the silicon carbide porous body after producing the amorphous and/or crystalline $SiO_2$ or SiO to from 0 to 0.12% by mass in $Na_2O$ equivalent.

(11)
A method for producing the silicon carbide porous material according to any one of (1) to (9), comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it, and then heating it in an oxygen-containing atmosphere in a temperature range of from 500 to 1400° C. to produce amorphous and/or crystalline $SiO_2$ or SiO on a surface(s) of the component (A) and/or the component (B), wherein the method comprises controlling a content of sodium in the silicon carbide porous body after producing the amorphous and/or crystalline $SiO_2$ or SiO to from 0 to 0.12% by mass in $Na_2O$ equivalent.

(12)

A method for producing the silicon carbide porous material according to any one of (1) to (9), comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it, and then coating a surface(s) of the component (A) and/or the component (B) with a solution containing silicon and oxygen, and then performing a heat treatment to produce amorphous and/or crystalline $SiO_2$ or SiO on the surface(s) of the component (A) and/or the component (B), wherein the method comprises controlling a content of sodium in the silicon carbide porous body after producing the amorphous and/or crystalline $SiO_2$ or SiO to from 0 to 0.12% by mass in $Na_2O$ equivalent.

(13)

The method according to any one of (10) to (12), wherein the method comprising adding to the silicon carbide particle material, before replacing a part or all of the sodium in the inorganic binder with a nonmetallic ion.

(14)

The method according to any one of (10) to (13), wherein the inorganic binder is smectite.

(15)

The method according to (14), wherein the smectite is montmorillonite.

(16)

The method according to any one of (10) to (15), wherein the silicon carbide porous body is a honeycomb structure.

Advantageous Effects of Invention

According to the present invention, it is possible to provide a silicon carbide porous body having higher thermal shock resistance and a method for producing the same.

BRIEF DESCRIPTION OF DRAWINGS

FIG. 1 is a perspective view schematically showing one embodiment of a silicon carbide porous body according to the present invention.

FIG. 2 is a cross-sectional view schematically showing a cross section parallel to a cell extending direction of one embodiment of a silicon carbide porous body according to the present invention.

FIG. 3 is an enlarged cross-sectional view enlarging a cross section perpendicular to a flow path direction of a cell in a honeycomb catalyst body to which a silicon carbide porous body according to an embodiment according to the present invention is applied.

FIG. 4 is a perspective view showing production conditions of a silicon carbide porous body according to one embodiment of the present invention.

DESCRIPTION OF THE PREFERRED EMBODIMENTS

Hereinafter, embodiments of the present invention will be described. However, it should be understood that the present invention is not limited to the following embodiments, and design changes, modifications, improvement and the like may be optionally added based on ordinary knowledge of those skilled in the art without departing from the spirit of the present invention.

(Silicon Carbide Particles as Aggregate)

A silicon carbide porous body according to the present embodiment includes (A) silicon carbide particles as an aggregate. The silicon carbide has polymorphic forms of α-SiC and β-SiC. In the silicon carbide porous body according to the present invention, the silicon carbide contained is preferably all β-SiC, or both α-SiC and β-SiC. When both α-SiC and β-SiC are contained, a content ratio of β-SiC to the total of α-SiC and β-SiC is, as an upper limit, preferably 5% by mass or more, and more preferably 5% by mass or more, and even more preferably 15% by mass or more, and as a lower limit, preferably less than 100% by mass, and more preferably 90% by mass or less, and even more preferably 80% by mass or less. The content ratio of β-SiC within the above numerical range can provide sufficient strength. If the content of β-SiC is less than 5% by mass, the strength tends to be insufficient. Further, it is preferable to use silicon carbide powder having an average particle diameter of from 10 to 50 μm.

In the silicon carbide forming the silicon carbide porous body according to the present embodiment, at least a part of β-SiC is generally contained in the form of particles. At least a part of the β-SiC in the form of particles is formed by reaction of a carbon raw material used for the production of the silicon carbide porous material of the present invention with silicon, and the β-SiC preferably maintains the particle shape of the carbon raw material or is contained in the silicon carbide porous body in a state of presenting a similar shape to the particle shape of the carbon raw material, without significant change of the particle shape of the carbon raw material. When at least a part of β-SiC is contained in such a shape, the silicon carbide porous body having higher porosity and a higher pore diameter is easily obtained.

(At Least One Selected from the Group Consisting of Metallic Silicon, Alumina, Ailica, Mullite and Cordierite)

In addition to the above aggregate, the silicon carbide porous body according to this embodiment contains at least one selected from the group consisting of (B) metallic silicon, alumina, silica, mullite and cordierite.

The use of the metallic silicon for bonding of silicon carbide particles that are refractory particles provides higher thermal conductivity than that of the conventional structure utilizing a vitreous material for binding the refractory particles. Therefore, when it is used for DPF, for example, any local temperature rise that would damage the filter does not occur even if accumulated particulates are burned for filter regeneration. Further, it is preferable to use metallic silicon powder having an average particle diameter of from 1 to 20 μm.

Furthermore, when Al is used as at least a part of the metals to be contained in the raw material mixture to produce the silicon carbide porous body, the Al is oxidized during the firing process to form alumina ($Al_2O_3$) in the silicon carbide porous body. The Al added as the raw material has an action of improving wettability of SiC to silicon (Si) or silicide, whereby grain growth of SiC in the silicon carbide porous body is promoted and a structure having SiC with a higher particle diameter as an aggregate is obtained, resulting in a silicon carbide porous body having higher strength.

Mullite ($3Al_2O_3.2SiO_2$) can be an alumina source.

Cordierite is a ceramic comprised of a raw material blended to have a chemical composition such that, for example, silica ($SiO_2$) is in a range of from 42 to 56% by mass, alumina ($Al_2O_3$) is in a range of from 30 to 45% by mass, and magnesia (MgO) is in a range of from 12 to 16% by mass. Specifically, for example, the cordierite can be obtained by firing a ceramic raw material containing a plurality of inorganic raw materials selected from alumina, aluminum hydroxide, talc, silica, kaolin and the like in a proportion so as to have the above chemical composition.

A mass ratio of (A) and (B) is, but not particularly limited to, preferably from about 90:10 to 60:40 in mass ratio, for example.

(Amorphous and/or Crystalline $SiO_2$ or SiO)

The silicon carbide porous body according to the present embodiment has amorphous and/or crystalline $SiO_2$ or SiO (hereinafter simply referred to as an "oxide film") on a surface(s) of the above (A) and/or (B). Since the silicon carbide porous body has the oxide film, oxidative decomposition of (A) or (B) is suppressed even if it is exposed to an elevated temperature in a low oxygen atmosphere during use as a DPF. That is, since the silicon carbide porous body according to the present invention has improved oxidation resistance, the filter is not damaged by heat generation due to oxidation reaction of silicon carbide or metallic silicon during filter regeneration. Further, the silicon carbide porous body having a phase having these compositions on the surface(s) of (A) and/or (B) can allow effective improvement of oxidation resistance, acid resistance, particulate reactivity and thermal shock resistance.

The above effect can be obtained if the oxide film is present on a part of the surface(s) of the above (A) and/or (B), but the oxide film may be preferably present on the entire surface of (A) and/or (B). In terms of further improving the above effect, the amorphous and/or crystalline $SiO_2$ or SiO preferably has a thickness of 0.5 μm or more.

Here, the thickness of the oxide film is determined by mirror-polishing the silicon carbide porous body embedded in a resin using a diamond slurry or the like to form an observation sample, and observing a cross-section polished surface of the sample for the oxide film around the main body of the silicon carbide porous body using SEM at magnifications of 2 and measuring a thickness from a boundary surface between the oxide film and pores to a boundary surface between the oxide film and the silicon carbide particles to determine the thickness of the oxide film. Arbitrary 15 positions are selected from a field of view at magnifications of 750 and an average value of the measured thicknesses of the oxide film is determined to be the thickness of the amorphous and/or crystalline $SiO_2$ or SiO.

(α-Cristobalite)

In the present embodiment, a content of α-cristobalite contained in amorphous and/or crystalline $SiO_2$ or SiO is 6% by mass or less.

As stated above, when the oxide film contains a large amount of α-cristobalite, the thermal expansion due to the α→β phase transition of α-cristobalite is increased and the thermal shock resistance is decreased, so that it is important to control the content of α-cristobalite to 6% by mass or less. A method for controlling α-cristobalite will be described in a later part.

The content of α-cristobalite in the oxide film can be determined by identifying crystal phases by X-ray analysis (XRD) measurement and quantifying each crystal phase by Rietveld analysis.

(Inorganic Binder)

The silicon carbide porous body according to the present embodiment can contain from 1 to 5 parts by mass of an inorganic binder based on 100 parts by mass of the total mass of the above (A) and (B).

For example, the silicon carbide porous body according to the present invention can contain an inorganic material having a layered structure (inorganic layered material) as an inorganic binder. As used herein, the term "layered structure" means "a structure such that in particular, surfaces having densely packed atoms are arranged in parallel with each other, by somewhat weak binding force such as Van Der Waals force and electrostatic force via an interlayer cation", for example, as described in "Ceramics Dictionary", 1986, published by Maruzen Co., Ltd.

Examples of the inorganic layered material (mineral group) used in the present embodiment include pyrophyllite-talc (specifically, talc, an interlayer cation: none), smectite (specifically, montmorillonite, hectorite, interlayer cations: Na, Ca), vermiculite (specifically, vermiculite, interlayer cations: Mg, (Na, K, Ca)), mica (specifically, muscovite, illite, interlayer cations: K, Na, Ca (Mg, Fe)), clintonite (specifically, margarite, an interlayer cation: Ca), hydrotalcite (specifically, hydrotalcite, an interlayer cation: none), and the like. Thus, the inorganic layered materials used in the present embodiment often contain elements (cations) such as sodium, calcium, potassium and the like.

In the present embodiment, a content ratio of the inorganic layered material is from 0.01 to 10 parts by mass, and preferably from 1.0 to 5.0% by mass, based on 100 parts by mass of the total of the (A) and (B). If it is less than 0.01 parts by mass, cracks are generated in the honeycomb formed body after the calcination (binder removal) or the strength is lowered. If it is more than 10 parts by mass, the porosity may be decreased due to firing shrinkage of the oxides during the firing. It should be noted that the inorganic layered materials used in the present invention may be used alone or in combination of two or more.

In this embodiment, the smectite is preferably used as the inorganic layered material, in terms of price and composition. The smectite refers to a clay mineral group having a structure in which one unit is one sheet having a octahedral layer mainly composed of silicon (Si) or magnesium (Mg) and oxygen (O) sandwiched from an upper and lower parts of the octahedral layer by tetrahedral layers each mainly composed of silicon (Si) or aluminum (Al) and oxygen (O), and an alkali metal(s) or an ion(s) of the alkali metal is/are intercalated between the layers. Further, clay containing a large amount of montmorillonite may be generally referred to as bentonite.

In the embodiment, it is preferable to use alkali ion type smectite in which the interlayer cation is an alkali ion, as smectite, in terms of improving plasticity and formability of a green body.

In the embodiment, it is preferable to use alkaline earth metal smectite in which the interlayer cation is an alkaline earth metal ion, as smectite, from the viewpoint that evaporation of the alkali metal during firing can be suppressed.

In the embodiment, it is preferable to use hydrotalcite as the inorganic layered material from the viewpoint that the evaporation of the alkali metal during firing can be suppressed. Talc may also be used. Even if talc is used, the same effect as hydrotalcite can be obtained.

(Content of Sodium)

In the present embodiment, a content of sodium in the silicon carbide porous body is preferably from 0 to 0.12% by mass in $Na_2O$ equivalent. The content of sodium of from 0 to 0.12% by mass in $Na_2O$ equivalent can allow promotion of formation of an α-cristobalite phase in the oxide film, so that the content of α-cristobalite in the oxide film can be easily suppressed to 6% by mass. From this viewpoint, the content of sodium in the silicon carbide porous body is more preferably from 0 to 0.05% by mass in $Na_2O$ equivalent.

A method of controlling the sodium content will be described in a later part.

(Porosity)

In the present embodiment, a porosity of the silicon carbide porous body is preferably 55% or more. The porosity of 55% or more can allow reduction of pressure loss and allow supporting of an increased amount of selective reduction catalyst. It is possible to provide the porosity of the silicon carbide porous body to 55% or more while controlling the content of α-cristobalite in the oxide film to 6% by mass or less, by a method as described below.

The porosity can be calculated from the total pore volume (unit: $cm^3/g$) according to a mercury penetration method (in accordance with JIS R 1655) and an apparent density (unit: $g/cm^3$) according to an Archimedes method in water.

(Other)

In the present embodiment, a pore former may be further contained in the forming raw material in order to obtain a silicon carbide porous body having higher porosity. Such a pore former is a temperate for pores and can form pores having each a desired shape, size and distribution in the silicon carbide porous body, and increases the porosity to provide a porous honeycomb structure having higher porosity. Examples of such a pore former includes graphite, wheat flour, starch, phenol resins, poly(methyl methacrylate), polyethylene, polyethylene terephthalate, foaming resins (acrylonitrile-based plastic balloons) and the like. They burn themselves, rather than they form pores. Among them, the foaming resin is preferable in terms of suppressing generation of $CO_2$ or harmful gases and generation of cracks. When using the pore former, the content of the pore former is preferably 50 parts by mass or less, and more preferably 20 parts by mass or less, based on 100 parts by mass of the total of the (A) and (B).

In the present embodiment, a dispersion medium may be further contained in the (A) and (B) which are the forming raw materials. Examples of such a dispersion medium include water, wax and the like. A content of the dispersion varies depending on the forming materials to be used, and is thus difficult to be uniquely determined, but the amount is preferably adjusted such that the green body during the forming has appropriate hardness.

(Silicon Carbide Porous Body)

In the present invention, the shape of the silicon carbide porous body is not particularly limited, but it is, for example, a honeycomb structure 100 shown in FIGS. 1 and 2. The honeycomb structure 100 is made of the above porous materials according to the present invention. The honeycomb structure 100 has a shape including partition walls 1 that define a plurality of cells 2 extending from a first end face 11 that is one end surface to a second end face 12 that is other end surface. Although the honeycomb structure has a pillar shape in the drawing, the shape of the honeycomb structure may be, but not particularly limited to, a cylindrical shape, a tubular shape having polygonal (triangular, quadrangular, pentagonal, hexagonal, or the like) bottoms, or the like.

A thickness of the partition wall 1 is preferably from 100 to 500 μm, and more preferably from 125 to 400 μm. If the thickness of the partition walls 1 is less than the lower limit value, the strength is decreased, so that the honeycomb structure may be damaged when the honeycomb structure is stored in a can body. If it is more than the upper limit value, the pressure loss may be increased.

A cell shape (a cell shape in a cross section orthogonal to a cell extending direction) of the honeycomb structure 100 is not limited. Examples of the cell shape include triangles, quadrangles, hexagons, octagons, circles, or combinations thereof. Among the quadrangles, a square or a rectangle is preferable.

The honeycomb structure 100 preferably has a cell density of from 15 to 77 cells/$cm^2$, and more preferably from 20 to 62 cells/$cm^2$, and even more preferably 23 to 54 cells/$cm^2$. If the cell density is less than the lower limit, the strength will be decreased, so that the honeycomb structure may be broken when storing the honeycomb structure in a can body. If the cell density is more than the upper limit, the pressure loss may be increased.

As shown in FIGS. 1 and 2, the honeycomb structure 100 includes a plurality of pillar shaped honeycomb segments 17 and at least one joining layer 15 arranged so as to join side surfaces of the plurality of honeycomb segments 17 to each other. Such a segment structure enables the stress applied to the honeycomb structure when using the honeycomb structure as a filter to be alleviated.

The honeycomb structure 100 has plugged portions 8 disposed at opening portions of predetermined cells 2 (outflow cells 2b) on the first end face 11 and opening portions of the remaining cells 2 (inflow cells 2a) on the second end face 12. When the honeycomb structure according to the present invention is used as DPF or the like, such a structure is preferable. That is, by providing the plugged portions 8, an exhaust gas flowing into the honeycomb structure according to the present invention is filtered by the partition walls, so that particulate matters in the exhaust gas can be trapped well. In the honeycomb structure 100, each inflow cells 2a and each outflow cells 2b are alternately arranged. Thus, a checkered pattern is formed on each of the first end face 11 and the second end face 12 of the honeycomb structure 100 by the plugged portions 8 and the "opening portions of cells".

The plugged portions 8 are produced from a material which may be the same as or different from a material of the honeycomb segments 17.

As shown in FIGS. 1 and 2, the honeycomb structure 100 may have an outer periphery-coated layer 20 on an outer periphery of the honeycomb structure. This outer periphery-coated layer 20 may be made of the same material as that of the honeycomb segments. By forming the outer periphery-coated layer 20, defects such as clacking are difficult to occur even if an external force is received during transportation of the honeycomb structure 100, or the like.

The silicon carbide porous body according to the present embodiment can be used as a catalyst body for purifying components to be purified such as carbon monoxide contained in the exhaust gas, by supporting a catalyst on the partition walls. For example, in FIG. 3, a catalyst 22 adheres so as to fill the pores of the partition walls 1 that define the cells 2. Here, FIG. 3 is an enlarged cross-sectional view enlarging a cross section perpendicular to the flow path direction of the cell in the honeycomb catalyst body to which the silicon carbide porous body according to this embodiment is applied. In the figures, the catalyst 22 is distributed in the form of dots, but the distribution state of the catalyst 22 is not particularly limited.

Examples of such a catalyst include catalysts such as three-way gasoline engine exhaust gas purification catalysts, oxidation catalysts for gasoline engine or diesel engine exhaust gas purification, and SCR catalysts for selective NOx reduction. Specific examples of the catalyst include elemental substances or compounds including a noble metal element such as platinum (Pt), rhodium (Rh), and palladium (Pd) or a copper ion exchanged zeolite.

In general, an ease of transmission of a component to be purified contained in an exhaust gas when the exhaust gas passes through a certain flow path is inversely proportional to a square of a hydraulic diameter of the flow path. In the honeycomb structure supporting the catalyst, the hydraulic diameters of the pores are much smaller than the hydraulic diameter of the cells. Therefore, in the honeycomb structure, a catalyst layer (which may be, hereinafter, referred to as "cell surface catalyst layer") composed of catalysts supported on inner surfaces of the cells more easily transmits the component to be purified contained in the exhaust gas than a catalyst layer comprised of catalysts supported on inner surfaces of the pores (which may be, hereinafter, referred to as a "pore surface catalyst layer"). Thus, by increasing an amount of the catalyst contained in the pore surface catalyst layer (e.g., the noble metal) as compared with an amount of the catalyst contained in the cell surface catalyst layer, an efficiency of purifying the exhaust gas can be improved.

(Production Method)

Hereinafter, a method for producing the silicon carbide porous body according to the present invention will be described.

The method for producing the silicon carbide porous material includes adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it to produce amorphous and/or crystalline $SiO_2$ or SiO on a surface(s) of the component (A) and/or the component (B), wherein the method comprises controlling a content of sodium in the silicon carbide porous body after forming the amorphous and/or crystalline $SiO_2$ or SiO to from 0 to 0.12% by mass in $Na_2O$ equivalent.

First, the above forming raw materials are kneaded, and a surfactant, a pore former, water or the like is added as needed to prepare green body, and the prepared green body is formed and dried to prepare a formed body having a honeycomb shape or the like, and the prepared formed body is calcined to obtain a calcined body, and the calcined body is subjected to firing to obtain a porous honeycomb structure or the like. Hereinafter, the method is specifically described for each step.

A method for kneading the forming raw materials to prepare the green body includes, but not limited to, a method of using a kneader, a vacuum green body kneader or the like. The forming raw materials may contain trace amounts of impurities such as Fe, Al and Ca, but they may be used as they are or used after being purified by a chemical treatment such as chemical cleaning. When the honeycomb structure is used as a filter, a pore former may be added during preparation of the green body, for the purpose of increasing the porosity.

The pore former is not particularly limited as long as it becomes pores after firing, and examples of the pore former include graphite, starch, foaming resins, silica gel and the like. These may be used alone, or in combination of two or more A content of the pore former is preferably from 0.3 to 40 parts by mass based on 100 parts by mass of the total of materials for the aggregate powder and the binding material.

An average particle diameter of the pore former is preferably from 10 to 70 μm.

Examples of the organic binder include methyl cellulose, hydroxypropoxyl cellulose, hydroxyethyl cellulose, hydroxypropyl methyl cellulose, carboxymethyl cellulose, polyvinyl alcohol and the like. A content of the organic binder is preferably from 3 to 10 parts by mass based on 100 parts by mass of the total of materials for the aggregate powder and the binding material.

The surfactant that can be used includes ethylene glycol, dextrin, fatty acid soaps, polyalcohol and the like. These may be used alone, or in combination of two or more. A content of the surfactant is preferably 3 parts by mass or less based on 100 parts by mass of the total of materials for the aggregate powder and the binding material.

The green body can be formed into a predetermined shape including a honeycomb shape or the like, and the resulting formed body can be calcined in an oxygen-containing atmosphere to remove (degrease) the organic binder in the formed body, and then subjected to firing in an inert gas atmosphere such as nitrogen and argon to produce a silicon carbide porous material having a predetermined shape in which an oxide film(s) is/are formed on the surface(s) of (A) and/or (B). The shape to be formed and the forming method are not particularly limited, and can be appropriately determined according to the application.

Therefore, by calcination in the oxygen-containing atmosphere, oxidation reaction proceeds according to, for example, the following formula (1) or (2) to form an oxide film of silica:

$$SiC + 2O_2 \rightarrow SiO_2 + CO_2\uparrow \qquad (1)$$

$$Si + O_2 \rightarrow SiO_2 \qquad (2).$$

Next, another example of the method for producing the silicon carbide porous body according to the present invention will be described. That is, the silicon carbide porous body having a predetermined shape in which the oxide film(s) is/are formed on the surface(s) of (A) and/or (B) can also be produced by forming the above prepared powder or the green body into a predetermined shape including a honeycomb shape or the like, calcining the resulting formed body to remove (degrease) the organic binder in the formed body, and then firing it, and further heating it in an oxygen-containing atmosphere.

In the method for producing the silicon carbide porous body according to the present embodiment, a temperature of the heat treatment carried out in the oxygen-containing atmosphere is preferably from 500 to 1400° C., and more preferably from 550 to 1350° C., and even more preferably 1300° C. If the temperature is lower than 500° C., the formation of the oxide film will be insufficient. Conversely, if the temperature is higher than 1400° C., the predetermined shape may not be maintained, which is not preferable. Therefore, according to the method for producing the silicon carbide porous body according to the present invention set in the temperature range, the oxide film can be effectively formed on the surface of the formed body.

Next, a further example of the method for producing the silicon carbide porous body according to the present invention will be described. That is, the above prepared powder or the green body is formed into a predetermined shape including a honeycomb shape or the like, the resulting formed body is calcined to remove (degrease) the organic binder in the formed body, and then subjected to firing, and a surface (s) of the (A) and/or (B) forming the formed body is further coated with a solution containing silicon and oxygen. A heat treatment can be then carried out to produce the silicon carbide porous body having a predetermined shape in which the oxide film(s) is/are formed on the surface(s) of (A) and/or (B). Therefore, in contrast to the method for providing the oxide film by the oxidation reaction, the target silicon carbide porous body can also be produced by using a coating solution containing silicon and oxygen.

The solution containing silicon and oxygen that can be used can be mainly based on, for example, silicon alkoxide, silica sol, water glass or the like, and they may be mixed and used as needed. The heat treatment after coating may be carried out at a temperature of from 50° C. to 1400° C. for 10 minutes for 4 weeks. The thickness of the oxide film provided by coating can be appropriately controlled by adjusting a silicon concentration in the solution. Alternatively, the thickness of the film can be increased by repeating immersion in the solution and drying. Furthermore, the thickness of the film can also be controlled by adjusting a take-off speed of the object to be coated from the solution.

In the method for producing the silicon carbide porous body according to the present embodiment, the heat treatment performed after coating the surface of the formed body after the firing is preferably carried out a temperature of from 50 to 1400° C., and more preferably from 100 to 1300° C., and even more preferably from 150 to 1200° C. If the temperature is lower than 50° C., it takes a long time to form the oxide film sufficiently on the surface(s) of the (A) and/or (B), and conversely, if it is higher than 1400° C., the temperature will be closed to a melting point of metallic silicon, so that the predetermined shape may not be maintained, which is not preferable. Therefore, according to the method for producing the silicon carbide porous body according to the present invention set in the temperature range, the oxide film can be effectively formed on the surface(s) of the (A) and/or (B).

In the method for producing the silicon carbide porous body according to the present embodiment, the calcination is preferably performed at a temperature lower than a temperature at which the metallic silicon melts. Specifically, the calcination may be temporarily maintained at a predetermined temperature of from about 150 to 700° C., or may be carried out at a lower rate of temperature rise of 50° C./hr or less in a predetermined temperature range. Further, the approach of temporarily maintaining at the predetermined temperature may be either maintaining at one temperature level or multiple temperature levels depending on the type and amount of the organic binder to be used. When maintaining at the multiple temperature levels, the maintaining times may be the same as or different from each other. Similarly, the approach of the lower rate of temperature rise may be a lower rate only in a certain temperature zone or lower rates in multiple zones, and in the case of the multiple zones, the rates may be the same as or different from each other.

To obtain a structure in which refractory particles are bonded by metallic silicon, the metallic silicon should soften. Since the melting point of metallic silicon is 1410° C., the firing temperature in the firing is preferably 1410° C. or higher. Further, the optimum firing temperature is determined from a microstructure and characteristic values. However, if the temperature is higher than 1600° C., evaporation of metallic silicon will progress and will be difficult to bind the particles via metallic silicon. Therefore, the firing temperature is preferably from 1410 to 1600° C., and more preferably from 1420 to 1580° C.

In the method for producing the silicon carbide porous body according to any of the above embodiments, it is important to control the content of sodium in the silicon carbide porous body after the formation of the oxide film to from 0 to 0.12% by mass in $Na_2O$ equivalent. The content of sodium in the silicon carbide porous body after forming the oxide film of from 0 to 0.12% by mass in $Na_2O$ equivalent can allow suppression of generation of α-cristobalite, thereby enabling the content of α-cristobalite in the oxide film to be 6% by mass or less.

As a method for controlling the content of sodium in the silicon carbide porous body, it is considered that sodium contained in the raw material is reduced. Specifically, it is considered that a part or all of the sodium in the inorganic binder is replaced with non-metallic ions, before being added to the silicon carbide particle material.

The nonmetallic ions that can be considered includes, but not limited to, an ammonium ion ($NH_4^+$), for example. As the replacing method, various known methods can be used.

It is believed that the formation of α-cristobalite contained in the oxide film is caused by the sodium in the silicon carbide porous body, and in addition, sodium mixed in the oxide film from the environment during the firing of the silicon carbide porous body is one cause. Therefore, the contamination of sodium in the oxide film can be reduced by controlling a firing atmosphere (a firing brick, a material of a kiln furniture, a shape of the kiln furniture, a flow rate of an inert gas) and the like during the production of the silicon carbide porous body, so that the formation of α-cristobalite contained in the oxide film can be suppressed.

FIG. 4 is a view showing general environmental conditions when a formed body 4 is calcined and fired. The calcination and the firing of the formed body 4 are performed in a firing furnace 31 (only some of furnace walls are shown in FIG. 4 for explanation). The formed body 4 is placed on a shelf plate 32, and between the formed body 4 and the shelf plate 32 are joint sands 34 for preventing deposition. The formed body 4 on the shelf plate 32 is surrounded by an enclosure 33 called a sagger.

It should be understood that although only one formed body 4 is shown for each shelf stage in the drawing, the number of formed bodies per a stage can be appropriately set in accordance with the necessity and equipment conditions, for example, about 6 to 12 formed bodies 4 may be installed.

Since oxygen is needed to calcine the formed body 4 to remove the organic binder in the formed body 4, it is necessary to provide a window 331 in order to ventilate a sagger 33 (see FIG. 4 (a)).

For the sodium mixed into the oxide film from the environment during the firing of the formed body 4, there is sodium emitted from the wall of the furnace 31 or the sagger 33. Therefore, to prevent sodium from being mixed from the wall of the furnace 31, it is considered that after the calcination, the sagger 33 having the window 331 is replaced with a sagger having no window (see FIG. 4 (b)) and the firing is carried out. It is also considered that a furnace 31 or sagger 33 made of a material with a lower sodium content is used.

It is also considered that the atmosphere in the furnace 31 is adjusted. Specifically, it is considered that by increasing the flow rate of the inert gas, the concentration of the sodium vapor emitted from the furnace 31 or the sagger 33 is decreased to suppress the sodium contamination.

Using each of fired honeycomb formed bodies 4 as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment in a state where joining material adhesion preventing masks are attached to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, a honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall.

The material of the joining material adhesion preventing mask that can be suitably used includes, but not particularly limited to, synthetic resins such as polypropylene (PP), polyethylene terephthalate (PET), polyimide, Teflon® and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include an adhesive film having a thickness of from 20 to 50 μm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirin, corundum, and titania, and more preferably having the same material as that of the honeycomb structure. The binder includes polyvinyl alcohol, methyl cellulose, CMC (carboxymethyl cellulose) and the like.

EXAMPLES

Hereinafter, the present invention will be described more specifically with reference to Examples, but the present invention is not limited to these Examples.

Ceramic powder (A) and ceramic powder (B) shown in Table 1 were prepared, and predetermined parts by weight of an inorganic binder, a pore former, an organic binder and water were added to the total 100 parts by mass of the (A) and (B) so as to have the composition of each of Examples and Comparative Examples as shown in Table 1, and uniformly mixed and kneaded to obtain a forming green body. The green body thus obtained was formed by an extruder into a quadrangular pillar shaped honeycomb formed body having a thickness of partition wall of 0.30 mm, a cell density of 46 cells/cm$^2$, regular rectangular end faces each having a side length of 36 mm, and a length of 141 mm.

In Table 1, an amount of Na in "Na-Less Alumina" is about 0.05% by mass, an amount of Na in "Na-Less Silica" is 0.01% by mass or less, an amount of Na in "Na-Less Montmorillonite" is about 0.07% by mass, and an amount of Na in "Na-Less Starch" is about 0.01% by mass.

Each honeycomb formed body was subjected to calcination, firing and an oxidation treatment under the conditions as shown in Table 2 to prepare a silicon carbide porous body having an oxide film.

In Table 2, "SINSIC" is a product of NGK ADREK CO., LTD., and "SUS" is SUS 304 available from Wanamitec Corporation.

(α-Cristobalite)

For the silicon carbide porous body of each of Examples and Comparative Examples, an amount of α-cristobalite contained in the oxide film was measured as follows. First, an X-ray diffraction pattern of the oxide film was obtained using an X-ray diffraction apparatus (available from Bruker AXS, D8 ADVANCE) (main measurement conditions: characteristic X-ray of CuKα, bulb voltage of 10 kV, a tube current of 20 mA, a diffraction angle 2θ=5 to 100°). The X-ray diffraction data obtained by the Rietveld method was then analyzed using analysis software TOPAS (available from Bruker AXS) to quantify each crystal phase.

(Thickness of Oxide Film)

Each silicon carbide porous body was embedded in a resin, and the embedded porous body was subjected to mirror polishing using a diamond slurry to form an observation sample, and a cross-sectional polished surface of the sample was observed for the oxide film around the silicon carbide at magnifications of 750 using SEM. A thickness from a boundary surface between the oxide film and the pores to a boundary surface between the oxide film and the silicon carbide particles was measured and determined to be the thickness of the oxide film. Arbitrary 15 positions were selected from a field of view at magnifications of 750 and an average value of the thicknesses of the measured oxide film was determined to be the thickness of the oxide film of the porous material (the thickness of $SiO_2$ oxide film).

(Sodium ($Na_2O$) and Other Chemical Components)

Quantitative analysis was performed on sodium ($Na_2O$) and other chemical components by ICP emission spectroscopy.

(Porosity)

The porosity was calculated from the total pore volume (unit: cm$^3$/g) according to a mercury penetration method (in accordance with JIS R 1655) and an apparent density (unit: g/cm$^3$) according to an Archimedes method in water.

(Thermal Expansion Coefficient)

The thermal expansion coefficient was measured by a method in accordance with JIS R 1618.

(Thermal Shock Resistance)

The thermal shock resistance was evaluated by a rapid cooling test (an electric furnace spalling test). Specifically, the total 16 quadrangular pillar shaped silicon carbide porous bodies (honeycomb segments) of each of Examples and Comparative Examples were combined via joining material layers and then subjected to grinding and coating of the outer periphery to obtain a cylindrical honeycomb structure which was used for evaluation. A method for producing the honeycomb structure will be described below. First, the honeycomb segments was joined to each other under pressure using a joining material mainly based on silicon carbide and ceramic fibers and containing colloidal silica as an inorganic adhesive, and drying them at 140° C. for 2 hours to obtain a honeycomb segment joined body. Then, after the outer periphery of the resulting honeycomb segment joined body was cut into a cylindrical shape, an outer peripheral coating material mainly based on silicon carbide and ceramic fibers and containing colloidal silica as an inorganic adhesive was applied, and then cured by drying for 2 hours to obtain a honeycomb structure, which was used as a test sample.

Each honeycomb structure of the silicon carbide porous body was heated in an electric furnace at a predetermined starting temperature (350° C. or 400° C.) for 2 hours to render the entire temperature uniform, and then taken out from the electric furnace and rapidly cooled to room temperature. After the rapid cooling, the thermal shock resistance was evaluated depending on whether or not cracks were generated in the honeycomb structure. A case where no generated crack was observed at the starting temperature of 400° C. was determined to be "Good"; a case where generated cracks were observed at the starting temperature of 400° C., but no generated crack was observed at the starting temperature of 350° C. was determined to be "Fair"; and a case where generated cracks were observed at the starting temperature of 350° C. was determined to be "Poor".

(Oxidation Resistance Test)

Evaluation was carried out with a weight increase rate in a predetermined low oxygen atmosphere (oxygen concentration of 1%) where active oxidation of silicon carbide tends to occur.

Specifically, each silicon carbide porous body was cut out into a cube having a side of about 10 mm to obtain a measurement sample, and a weight (A) was measured. The measurement sample was heated to 1200° C. at an elevated temperature rate of 300° C./hr in an atmosphere having an oxygen concentration of 1% using an electric furnace capable of controlling the atmosphere, and maintained for 10 minutes and then heated to room temperature at 300° C./hr. After removing it from the electric furnace, a weight (B) was measured. A case where a weight increase rate ((B−A)/A) of the measurement sample by the heat treatment was 0.2% or less was determined to be "Good", a case where the weight increase rate was more than 0.2% and 1.0% or less was determined to be "Fair", and a case where it was more than 1.0% was determined to be "Poor".

(NOx Purification Performance Test)

Evaluation was carried out by a model gas test simulating a diesel exhaust gas, as a NOx purification performance test.

Specifically, each silicon carbide porous body was ground in a mortar to a degree sufficient to pass through a sieve having an opening of 150 μm. The ground porous material and Cu-substituted zeolite catalyst were mixed at a weight ratio of 3:1. The mixed powder was uniaxially press-molded using a mold having a diameter of 30 mm. A sample obtained by pulverizing a pellet obtained by the molding into granules having from 2 to 3 millimeters was maintained in an oxidizing atmosphere containing 10% water vapor at 850° C. for 16 hours and subjected to a heat treatment to obtain an evaluation sample (a weight of 10 g).

The evaluation sample was evaluated using a motor vehicle exhaust gas analyzer (SIGU 1000: available from HORIBA Ltd.). For evaluation conditions, a mixed gas containing 10% of $O_2$, 8% of $CO_2$, 5% of $H_2O$, 150 ppm of NO and 300 ppm of $NH_3$ was introduced as a reaction gas at a temperature of 200° C., and a concentration of each component of the exhaust gas that had passed through the measurement sample was analyzed using an exhaust gas measuring device (MEXA-6000 FT: available from HORIBA Ltd.), and a decreased ratio of NO gas was evaluated. A sample in which a NOx conversion rate was 70% or more was determined to be "Good", a sample in which a NOx conversion rate was 50% or more and less than 70% was determined to be "Fair", and a sample in which a NOx conversion rate was less than 50% was determined to be "Poor".

TABLE 1

| | | | Example 1 | Example 2 | Example 3 | Example 4 | Example 5 | Example 6 | Example 7 | Example 8 |
|---|---|---|---|---|---|---|---|---|---|---|
| Prepared Ratio (wt %) *Total of (A) and (B) is 100 parts by mass | (A) | SiC | 80 | 80 | 80 | 80 | 80 | 80 | 80 | 80 |
| | (B) | Metallic Si | 20 | 20 | 20 | 20 | 20 | 20 | 20 | 20 |
| | | Talc | | | | | | | | |
| | | Alumina | | | | | | | | |
| | | Na-Less Alumina | | | | | | | | |
| | | Silica | | | | | | | | |
| | | Na-Less Silica | | | | | | | | |
| | Inorganic Binder (Inorganic Layered Material) | Montmorillonite | 3 | 3 | 3 | 3 | 1 | | | 1 |
| | | Na-Less Montmorillonite | | | | | 2 | 3 | 3 | |
| | Pore Former | Starch | 20 | 20 | 20 | 20 | 20 | 20 | | 7 |
| | | Na-Less Starch | | | | | | | 20 | |
| | Organic Binder | Hydroxypropyl-methyl Cellulose | 7 | 7 | 7 | 7 | 7 | 7 | 7 | 7 |
| Total Amount of $Na_2O$ in Raw Material (wt %) | | | 0.14 | 0.14 | 0.14 | 0.14 | 0.08 | 0.05 | 0.05 | 0.06 |
| Firing Conditions (Shape and Material of Sheath, Temperature and Atmosphere of Firing, etc.) | | | 1) | 2) | 3) | 4) | 3) | 3) | 3) | 3) |
| Material Properties | Chemical Component | SiC (wt %) | 68.8 | 68.7 | 69.5 | 72.0 | 69.9 | 70.2 | 70.3 | 71.0 |
| | | $SiO_2$ (wt %) | 12.7 | 13.1 | 12.9 | 9.2 | 13.0 | 12.9 | 12.8 | 10.8 |
| | | Si (wt %) | 15.3 | 15.0 | 14.6 | 17.0 | 14.1 | 14.0 | 14.0 | 16.3 |
| | | $Al_2O_3$ (wt %) | 0.4 | 0.4 | 0.4 | 0.4 | 0.4 | 0.4 | 0.4 | 0.5 |
| | | MgO (wt %) | | | | | | | | |
| | | $Na_2O$ (wt %) | 0.12 | 0.09 | 0.07 | 0.07 | 0.05 | 0.03 | <0.01 Below Detection Limit | 0.03 |
| | Thickness of $SiO_2$ Oxide Film (μm) | | 0.9 | 1.1 | 1.0 | 0.5 | 1.1 | 1.0 | 1.0 | 1.0 |
| | Crystal Quantitative Value (Rietveld Analysis) | α-cristobalite | 5.9 | 5.8 | 5.6 | 4.2 | 5.4 | 5.2 | 5.0 | 4.7 |
| | | beta-cristobalite | 6.3 | 6.7 | 6.7 | 4.6 | 6.9 | 7.0 | 7.2 | 5.7 |
| | Porosity (%) | | 63 | 63 | 63 | 62 | 63 | 63 | 63 | 48 |
| | Thermal Expansion Coefficient (ppm/K) | | 5.0 | 4.9 | 4.8 | 4.5 | 4.7 | 4.6 | 4.5 | 4.6 |
| Product Performance Evaluation | Thermal Shock Resistance Test | | Fair | Fair | Good | Good | Good | Good | Good | Good |
| | Oxidation Resistance Test | | Good | Good | Good | Fair | Good | Good | Good | Good |
| | $NO_x$ Purification Performance Test | | Fair | Fair | Fair | Fair | Good | Good | Good | Poor |

TABLE 1-continued

|  |  |  | Example 9 | Example 10 | Example 11 | Example 12 | Example 13 | Example 14 |
|---|---|---|---|---|---|---|---|---|
| Prepared Ratio (wt %) *Total of (A) and (B) is 100 parts by mass | (A) | SiC | 80 | 80 | 80 | 79 | 79 | 79 |
|  | (B) | Metallic Si | 20 | 20 | 20 |  |  |  |
|  |  | Talc |  |  |  | 7.5 | 7.5 | 7.5 |
|  |  | Alumina |  |  |  |  |  |  |
|  |  | Na-Less Alumina |  |  |  | 9.5 | 9.5 | 9.5 |
|  |  | Silica |  |  |  | 4 |  |  |
|  |  | Na-Less Silica |  |  |  |  | 4 | 4 |
|  | Inorganic Binder (Inorganic Layered Material) | Montmorillonite |  |  |  |  |  |  |
|  |  | Na-Less Montmorillonite | 2 | 3 | 3 | 5 | 5 | 5 |
|  | Pore Former | Starch | 10 | 14 | 26 | 30 | 30 |  |
|  |  | Na-Less Starch |  |  |  |  |  | 30 |
|  | Organic Binder | Hydroxypropyl-methyl Cellulose | 7 | 7 | 7 | 7 | 7 | 7 |
| Total Amount of Na$_2$O in Raw Material (wt %) |  |  | 0.03 | 0.04 | 0.06 | 0.11 | 0.07 | 0.05 |
| Firing Conditions (Shape and Material of Sheath, Temperature and Atmosphere of Firing, etc.) |  |  | 3) | 3) | 3) | 6) | 6) | 6) |
| Material Properties | Chemical Component | SiC (wt %) | 70.5 | 70.0 | 68.6 | 63.2 | 63.6 | 64.0 |
|  |  | SiO$_2$ (wt %) | 11.7 | 12.5 | 13.4 | 24.3 | 24.0 | 23.6 |
|  |  | Si (wt %) | 15.9 | 14.8 | 14.9 |  |  |  |
|  |  | Al$_2$O$_3$ (wt %) | 0.4 | 0.4 | 0.4 | 9.6 | 9.4 | 9.5 |
|  |  | MgO (wt %) |  |  |  | 2.0 | 2.0 | 2.0 |
|  |  | Na$_2$O (wt %) | 0.01 | 0.02 | 0.04 | 0.08 | 0.06 | 0.04 |
|  | Thickness of SiO$_2$ Oxide Film (μm) |  | 0.9 | 1.0 | 1.1 | 1.0 | 1.0 | 1.0 |
|  | Crystal Quantitative Value (Rietveld Analysis) | α-cristobalite | 4.9 | 5.1 | 5.9 | 6.0 | 5.8 | 5.7 |
|  |  | beta-cristobalite | 6.1 | 6.8 | 6.8 | 6.0 | 6.5 | 7.1 |
|  | Porosity (%) |  | 55 | 59 | 65 | 65 | 65 | 65 |
|  | Thermal Expansion Coefficient (ppm/K) |  | 4.6 | 4.7 | 5.0 | 4.9 | 4.8 | 4.7 |
| Product Performance Evaluation | Thermal Shock Resistance Test |  | Good | Good | Fair | Fair | Good | Good |
|  | Oxidation Resistance Test |  | Good | Good | Good | Good | Good | Good |
|  | NO$_x$ Purification Performance Test |  | Fair | Fair | Fair | Fair | Fair | Good |

|  |  |  | Comp. 1 | Comp. 2 | Comp. 3 | Comp. 4 |
|---|---|---|---|---|---|---|
| Prepared Ratio (wt %) *Total of (A) and (B) is 100 parts by mass | (A) | SiC | 80 | 80 | 79 | 79 |
|  | (B) | Metallic Si | 20 | 20 |  |  |
|  |  | Talc |  |  | 7.5 | 7.5 |
|  |  | Alumina |  |  | 9.5 |  |
|  |  | Na-Less Alumina |  |  |  | 9.5 |
|  |  | Silica |  |  | 4 |  |
|  |  | Na-Less Silica |  |  |  | 4 |
|  | Inorganic Binder (Inorganic Layered Material) | Montmorillonite | 3 | 5 | 5 | 5 |
|  |  | Na-Less Montmorillonite |  |  |  |  |
|  | Pore Former | Starch | 20 | 20 | 30 |  |
|  |  | Na-Less Starch |  |  |  | 30 |
|  | Organic Binder | Hydroxypropyl-methyl Cellulose | 7 | 7 | 7 | 7 |
| Total Amount of Na$_2$O in Raw Material (wt %) |  |  | 0.14 | 0.20 | 0.29 | 0.20 |
| Firing Conditions |  |  | 5) | 1) | 7) | 7) |
| Material Properties | Chemical Component | SiC (wt %) | 68.0 | 68.5 | 62.5 | 63.0 |
|  |  | SiO$_2$ (wt %) | 14.5 | 13.4 | 26.0 | 24.5 |
|  |  | Si (wt %) | 14.3 | 15.0 |  |  |
|  |  | Al$_2$O$_3$ (wt %) | 0.4 | 0.4 | 9.4 | 9.5 |
|  |  | MgO (wt %) |  |  | 2.0 | 2.0 |
|  |  | Na$_2$O (wt %) | 0.14 | 0.17 | 0.25 | 0.18 |
|  | Thickness of SiO$_2$ Oxide Film (μm) |  | 1.4 | 1.1 | 1.2 | 1.0 |
|  | Crystal Quantitative Value (Rietveld Analysis) | α-cristobalite | 6.3 | 6.5 | 8.5 | 7.0 |
|  |  | beta-cristobalite | 7.3 | 6.2 | 5.4 | 5.8 |
|  | Porosity (%) |  | 63 | 61 | 65 | 65 |
|  | Thermal Expansion Coefficient (ppm/K) |  | 5.4 | 5.3 | 5.2 | 5.1 |
| Product Performance Evaluation | Thermal Shock Resistance Test |  | Poor | Poor | Poor | Poor |
|  | Oxidation Resistance Test |  | Good | Good | Fair | Fair |
|  | NO$_x$ Purification Performance Test |  | Poor | Poor | Poor | Poor |

TABLE 2

|  | 1) | 2) | 3) | 4) | 5) | 6) | 7) |
|---|---|---|---|---|---|---|---|
| Sheath Shape (with Ventilation Window) | Degreasing Firing | with Window | with Window | with Window without Window | with Window without Window | with Window | with Window without Window | with Window |

TABLE 2-continued

|  |  | 1) | 2) | 3) | 4) | 5) | 6) | 7) |
|---|---|---|---|---|---|---|---|---|
| Sheath Material | Degreasing Firing | Alumina | SINSIC | SUS SINSIC | SUS SINSIC | SINSIC | SUS SINSIC | SINSIC |
| Degreasing | Temperature Atmosphere |  |  |  | 450° C. The Atmosphere |  |  |  |
| Firing | Temperature Atmosphere |  |  | 1430° C. Inert Gas (Argon Atmosphere) |  |  | 1330° C. |  |
| Oxidation Treatment | Temperature Atmosphere |  | 1220° C. |  | 1180° C. The Atmosphere | 1250° C. | 1220° C. | 1220° C. |

DISCUSSION

It was found from the results shown in Table 1 that Examples of the present invention had higher thermal shock resistance. In particular, it was found that when the porosity was 55% or more, desirable results was obtained for the NOx purification performance test, in addition to the higher thermal shock resistance. Further, it was found that Examples achieved the level of sodium content of 500 ppm or less (0.05% by mass or less), which was difficult to be achieved in the prior art.

On the other hand, in Comparative Example, an amount of α-cristobalite contained in the oxide film was more than 6% by mass, so that the evaluation of the thermal shock resistance of each comparative example was poor.

DESCRIPTION OF REFERENCE NUMERALS

1 . . . partition wall
100 . . . honeycomb structure
2 . . . cell
2a . . . inflow cell
2b . . . outflow cell
8 . . . plugged portion
11 . . . first end face
12 . . . second end face
15 . . . joining layer
17 . . . honeycomb segment
20: outer periphery-coated layer
22 . . . catalyst
31 . . . furnace
32 . . . shelf plate
33 . . . sagger
331 . . . window
34 . . . joint sand
4 . . . honeycomb formed body

What is claimed is:

1. A honeycomb structure comprising partition walls that define a plurality of cells extending from a first end face that is one end surface to a second end face that is an other end surface, the partition walls comprising silicon carbide porous body comprising: (A) silicon carbide particles as an aggregate; and (B) at least one selected from the group consisting of metallic silicon, alumina, silica, mullite and cordierite, the silicon carbide porous body having amorphous and/or crystalline $SiO_2$ or SiO on a surface(s) of the component (A) and/or the component (B),
wherein the silicon carbide porous body comprises 4.2% by mass or more to 6% by mass or less of α-cristobalite and 4.6% by mass or more to 7.2% by mass of β-cristobalite in the amorphous and/or crystalline $SiO_2$ or SiO,
wherein an amount of α-cristobalite is greater than an amount of α-cristobalite in the amorphous and/or crystalline $SiO_2$ or SiO, and
wherein the silicon carbide porous body has a sodium content of from 0.01 to 0.12% by mass in $Na_2O$ equivalent.

2. The honeycomb structure according to claim 1, wherein the amorphous and/or crystalline $SiO_2$ or SiO has a thickness of 0.5μm or more.

3. The honeycomb structure according to claim 1, wherein the silicon carbide porous body comprises from 1 to 5 parts by mass of an inorganic binder based on 100 parts by mass of the total of (A) and (B).

4. The honeycomb structure according to claim 3, wherein the inorganic binder is smectite.

5. The honeycomb structure according to claim 4, wherein the smectite is montmorillonite.

6. The honeycomb structure according to claim 1, wherein the silicon carbide porous body has a sodium content of from 0.01 to 0.05% by mass in $Na_2O$ equivalent.

7. The honeycomb structure according to claim 1, wherein the silicon carbide porous body has a porosity of 55% or more.

8. A method for producing the honeycomb structure according to claim 1, comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it to produce amorphous and/or crystalline $SiO_2$ or SiO on a surface(s) of the component (A) and/or the component (B),
wherein the method comprises controlling a content of sodium in the silicon carbide porous body after producing the amorphous and/or crystalline $SiO_2$ or SiO to from 0.01 to 0.12% by mass in $Na_2O$ equivalent.

9. A method for producing the honeycomb structure according to claim 1, comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it, and then heating it in an oxygen-containing atmosphere in a temperature range of from 500 to 1400° C. to produce amorphous and/or crystalline $SiO_2$ or SiO on a surface(s) of the component (A) and/or the component (B),
wherein the method comprises controlling a content of sodium in the silicon carbide porous body after producing the amorphous and/or crystalline $SiO_2$ or SiO to from 0.01 to 0.12% by mass in Na2O equivalent.

10. A method for producing the honeycomb structure according to claim 1, comprising adding, to (A) a silicon carbide particle material, (B) at least one selected from the group consisting of metallic silicon, alumina, silica, mullite and cordierite, an organic binder and an inorganic binder and mixing them, then forming the mixture into a predetermined shape, calcining the resulting formed body in an oxygen-containing atmosphere to remove the organic binder in the formed body, and then firing it, and then coating a surface(s) of the component (A) and/or the component (B) with a solution containing silicon and oxygen, and then performing a heat treatment to produce amorphous and/or crystalline $SiO_2$ or SiO on the surface(s) of the component (A) and/or the component (B), wherein the method comprises controlling a content of sodium in the silicon carbide porous body after producing the amorphous and/or crystalline $SiO_2$ or SiO to from 0.01 to 0.12% by mass in $Na_2O$ equivalent.

11. The method according to claim 8, wherein the method comprising adding to the silicon carbide particle material, before replacing a part or all of the sodium in the inorganic binder with a nonmetallic ion.

12. The method according to claim 8, wherein the inorganic binder is smectite.

13. The method according to claim 12, wherein the smectite is montmorillonite.

* * * * *